US012632586B2

(12) United States Patent
Ramos et al.

(10) Patent No.: US 12,632,586 B2
(45) Date of Patent: May 19, 2026

(54) DATABASE ACCESS CONTROLS DEFINED THROUGH LOGICAL EXPRESSIONS

(71) Applicant: SAP SE, Walldorf (DE)

(72) Inventors: Pedro Ziebell Ramos, Walldorf (DE); Lucas Mendonca de Souza Xavier, Walldorf (DE); Paulo Buttenbender, Walldorf (DE); Ioannis Kostis, Heidelberg (DE); Daniel Bertolozi Iop, Walldorf (DE)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 18/459,707

(22) Filed: Sep. 1, 2023

(65) Prior Publication Data

US 2025/0077699 A1     Mar. 6, 2025

(51) Int. Cl.
*G06F 21/62*      (2013.01)
*G06F 16/9038*    (2019.01)

(52) U.S. Cl.
CPC ...... *G06F 21/6227* (2013.01); *G06F 16/9038* (2019.01)

(58) Field of Classification Search
CPC .............. G06F 21/604; G06F 21/6227; G06F 21/6245; G06F 16/2457; G06F 16/9038; G06F 16/24564; G06F 21/6218
USPC .......................................................... 726/8
See application file for complete search history.

(56) References Cited

U.S. PATENT DOCUMENTS

| | | | | |
|---|---|---|---|---|
| 10,936,744 | B1* | 3/2021 | Trepetin | H04L 63/0421 |
| 2003/0037263 | A1* | 2/2003 | Kamat | G06F 21/6227 |
| | | | | 726/14 |
| 2007/0136237 | A1* | 6/2007 | Barker | G06F 21/6227 |
| 2008/0033960 | A1* | 2/2008 | Banks | H04L 9/0894 |
| | | | | 707/999.009 |
| 2018/0357318 | A1* | 12/2018 | Chen | G06F 16/9535 |
| 2019/0095516 | A1* | 3/2019 | Srinivasan | H04L 63/102 |
| 2020/0241972 | A1* | 7/2020 | Dain | G06F 16/2457 |
| 2021/0232632 | A1* | 7/2021 | Howard | G06F 16/211 |
| 2023/0281326 | A1* | 9/2023 | Magalsky | G06F 21/6245 |
| | | | | 726/1 |
| 2023/0306030 | A1* | 9/2023 | Korus | G06F 16/24564 |
| 2024/0257164 | A1* | 8/2024 | Tong | G06Q 30/0202 |
| 2024/0265125 | A1* | 8/2024 | Katwala | G06F 21/6218 |
| 2024/0281556 | A1* | 8/2024 | Thummala | G06F 21/6227 |
| 2024/0378305 | A1* | 11/2024 | Acharya | G06F 21/6227 |
| 2025/0124154 | A1* | 4/2025 | Peng | H04L 9/3236 |

* cited by examiner

*Primary Examiner* — James N Fiorillo
(74) *Attorney, Agent, or Firm* — Buckley, Maschoff & Talwalkar LLC

(57)          ABSTRACT

Provided herein is a process that converts unprotected data into protected data based on permissions defined using logical operators. As such, user permissions can be managed with a simple string of data. In one example, the method may include receiving a request for data from a user device, identifying a permission object corresponding to the user device, retrieving a string comprising a logical expression with a logical operator and one or more values from the permission object, wherein the logical expression defines access permissions of the user device with respect to a database, executing a database query on the database based on the request to generate results, and filtering the results from the database query based on the logical expression to generate filtered results and outputting the filtered results to the user device.

18 Claims, 7 Drawing Sheets

Figure 1B:
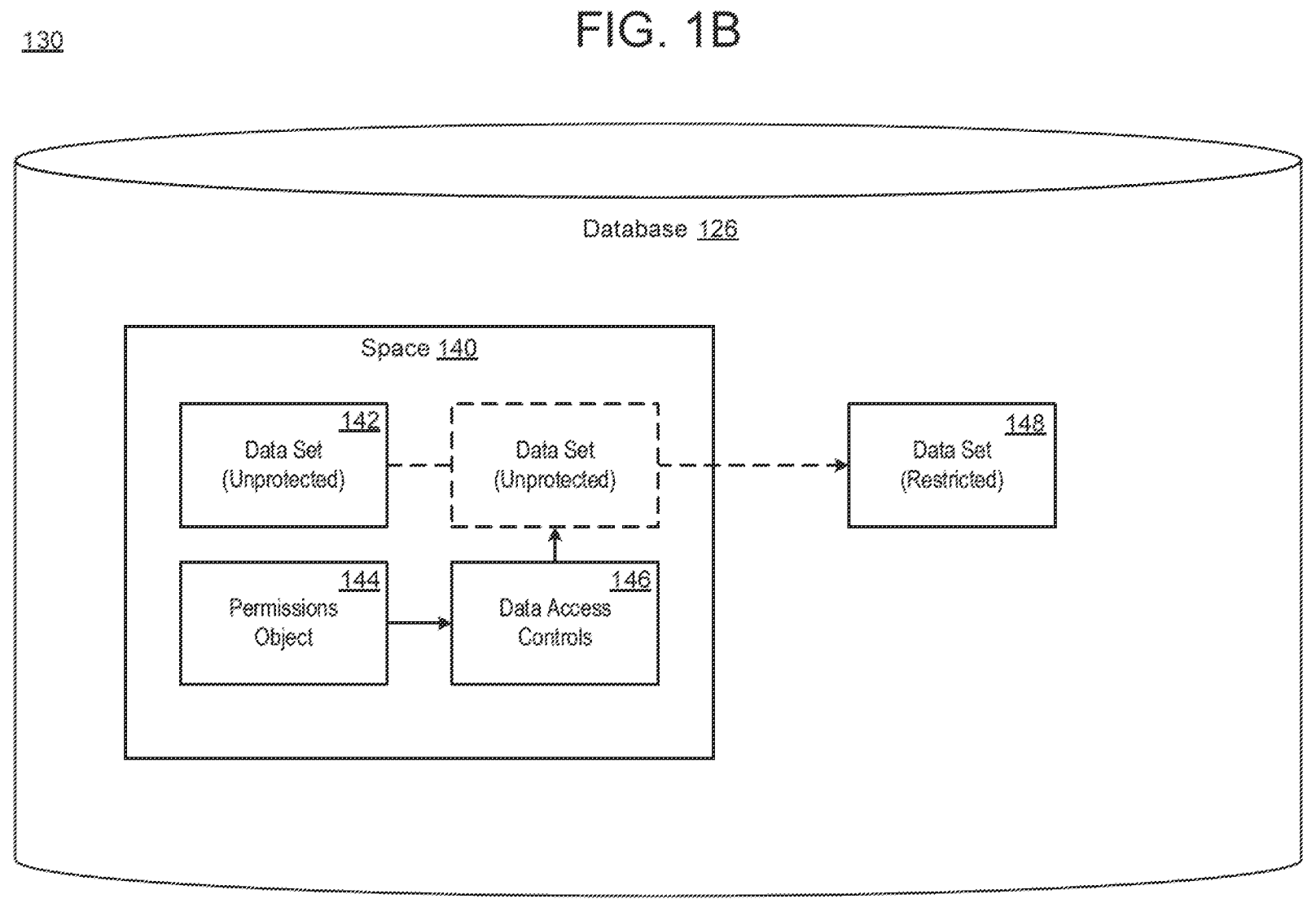

Database 126

Space 140

Data Set 142 (Unprotected)

Permissions Object 144

Data Set (Unprotected)

Data Access Controls 146

Data Set 148 (Restricted)

User Interface 200

Submit New Rule 230

Table ID: 202

User ID: 204

Logical Operator (Product Name): 210

Argument 1: 212

Argument 2: 214

Logical Operator (Country): 220

Argument 1: 222

Argument 2: 224

500

Receiving a Request for Data
from a User Device          510

Identifying a Permission Object
Corresponding to the User Device          520

Retrieving a String from the Permissions Object
with a Logical Expression          530

Executing a Database Query
Based on the Request          540

Filtering Results from the Database Query
based on the Logical Expression and Outputting
the Filtered Results          550

DATABASE ACCESS CONTROLS DEFINED THROUGH LOGICAL EXPRESSIONS

BACKGROUND

A software application deployed in a host environment often relies on a database for managing and storing the underlying data of the application. Each individual user of the software application may desire to control visibility/access to their own set of data that is stored and managed by the database. For example, a user may want to establish that only a subset of users can see access their data while another subset of users are not allowed to see the data. Controlling data visibility is often performed using the concept of row-level security.

Row-level security (RLS) is the process of controlling access to data in a database by row. When RLS is enabled, and a user desires to access a row of data within a database table, the RLS security policy must explicitly permit that user to access that individual row of data, else it will be filtered out. If a user is not listed in the security policy, they will see no records in the database table.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1B is a diagram illustrating a process of defining data permissions for a space within a database in accordance with an example embodiment.

DETAILED DESCRIPTION

Figure 1A:
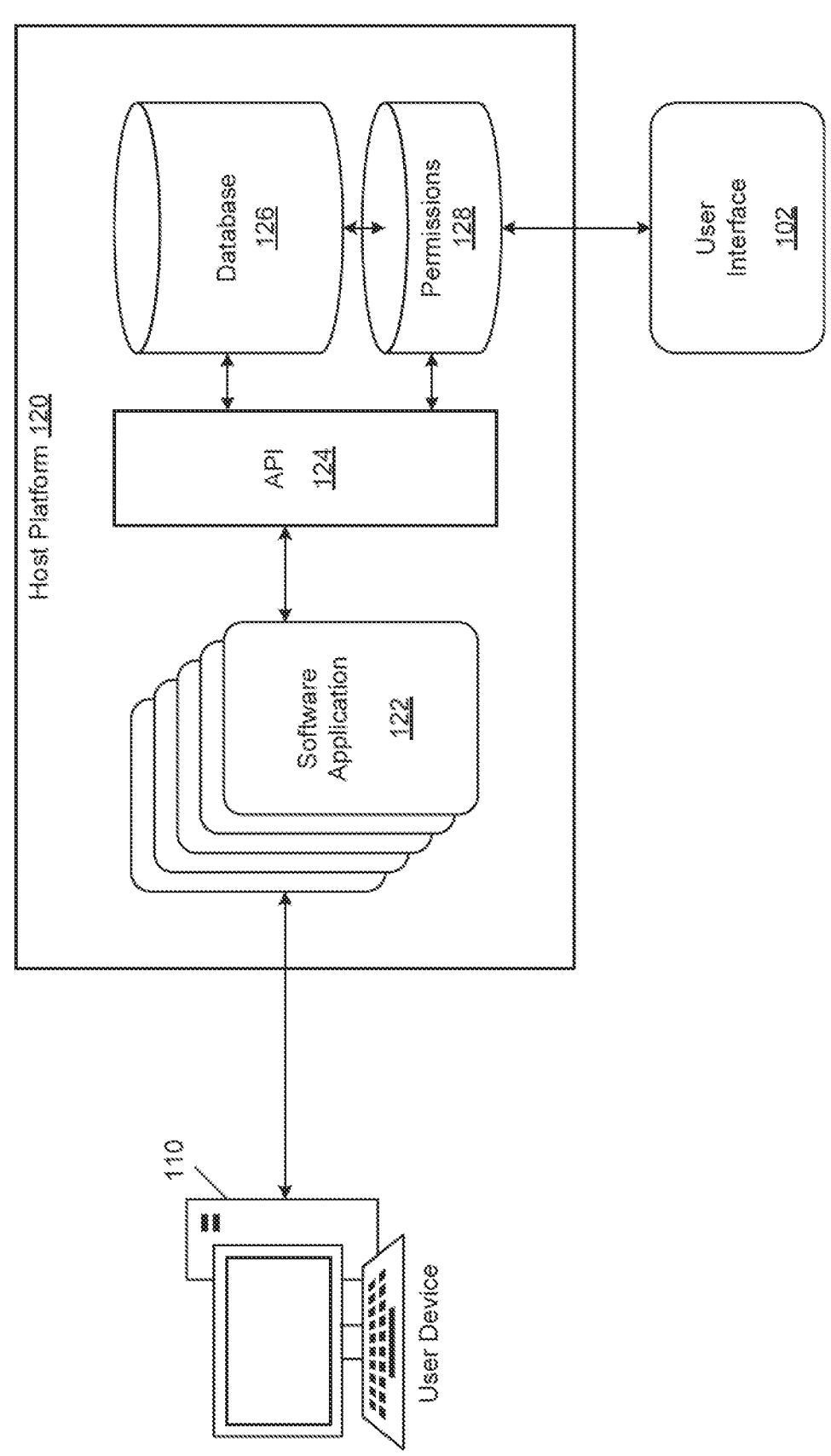
FIG. 1A is a diagram illustrating a host platform that performs access controls based on Boolean operators in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

As previously noted, RLS is the process of controlling access to data in a database by row. However, RLS has significant drawbacks. For example, a permission must be manually defined for each row that a user has access to. This same manual definition must also be set forth for each user. As an example, suppose a system includes three different users with three different permissions to a database table. In particular, a first user is able to access a first half of the table only, a second user is able to access a second half of the table only, and a third user can access the entire table. In order to define these access rules, the list of permissions is twice the size of the underlying dataset. The first and second user each require half the dataset's rows to be individually enumerated in the permissions list, which already makes for its total size, while the third requires the entire dataset to be enumerated. Furthermore, each time a new row is added to the database table, the permissions for each user must be set, leading to double maintenance. This takes significant time, as much as the number of possible users accessing the database. Furthermore, for users that have "full access" to the underlying database, permissions must be made for every possible row in the database.

The present application is directed towards a host platform that manages access to data stored in a database and address the above-noted drawbacks of existing RLS-based permissions. The host platform may be a cloud platform, a web server, an on-premises server, or the like. Software applications that are hosted by the host platform may store their data in the database. Each of the users of the software applications may manage access to their data stored in the database using permissions. Permissions enable the user to selectively enable visibility to their data for specific subsets of users.

Traditionally, permissions have been defined using lengthy lists that define a specific permission for each row that a user has access to. For example, if a user has access to twelve rows of data from a database table, then twelve permissions must be defined for the twelve rows. The example embodiments overcome this drawback and enable a single string to be used to define access permissions for a database table. To do this, a permissions object may be defined for a user which includes a logical expression (e.g., with a logical operator, Boolean operator, etc.) and values that are operated on by the logical operator. The permissions object may also include the single value lists as known previously, but in addition to these lists, the permissions object may now include logical expressions that rely on logical operators. As such, more permissions can be expressed with less strings of text/permission making the storage of the permissions significantly less. Furthermore, processing of permissions objects becomes easier and more lightweight as well.

In some embodiments, the underlying database may be a data warehouse, but embodiments are not limited thereto. In the database, a "space" may be defined which introduces a layer separation from the data within the space and the data held elsewhere in the database. Access to a given space requires explicit member assignment, which introduces segregation of responsibilities, and isolation of content. Spaces are quite flexible and can be used in several ways. For example, one could define one space per line of business (e.g., human resources, financial data, asset management, etc.)

When selecting a space, a user can define a model, much like one would in a cloud instance. For example, the model may include table definitions, views, table functions, calculation views (also known as analytic models), data flows, and the like. A user can combine and reuse multiple models to create new ones, using structured query language (SQL) operators like JOINS, add filters with WHERE conditions, calculated columns, input parameters, associations, etc., and finally preview their data to confirm it was modeled correctly. Besides, analyzing a model's impact (which entities consume it) and lineage (which entities it depends on) is a very useful tool provided by the datasphere. Furthermore, it is possible to share models across spaces, with third party application, or access them directly with a SQL technical user.

Before sharing their data model externally, the user may desire to set accessibility rights to their data. One common approach is to establish that some applications or users can only see a subset of columns (column-level security), or a subset of rows (row-level security). In other words, if a manager for region A accesses a global sales data model, it would be reasonable to assume that they would only see the sales rows for their region A, and not of the other regions B, C, and D. This is especially true for sensitive or personal data.

Most enterprise applications have some sort of native concept of row-level security, which may be referred to herein as Data Access Controls or DAC. The example embodiments may provide an extension of this functionality and may include a more comprehensive row-level security tool that does not exist in other data stores.

The user flow for creating and applying row-level security, then consuming that model may be performed as follows. First, the system may define the data to be protected and shared externally, e.g., product sales data categorized by product and country. The system may create a permissions entity containing authorization data for each user. For example, a user A can see data from countries A1 and A2, and for products bike and car. The system may create a Data Access Control (DAC) consuming the permissions entity containing the authorization data for each user. Here, the DAC may include two criteria for restricting access to the data based on country code and based on product name. The system may create a view on top of the unprotected dataset and attach the DAC. Next, the system may share view of the data sets with another space, application, user, etc. of the data store.

As such, consumers can build their models on top of the protected dataset, instead of the unprotected one. Accordingly, a user within a first space in the data store may share data to external consumers (another space or application). Here, the data that is shared is a protected version of a dataset that originally belongs to them. Some characteristics of Data Access Controls include that they can be attached to structured query language (SQL) Views, table functions, calculation views, and the like. These are referred to as DAC consumers. When attaching DACs, column mappings may also be provided. That is, each criterion of the Data Access Control may be assigned to one consumer column. The user is essentially informing the criteria targets.

The DACs can have multiple criteria that restricts access to the data. In the above-provided example, both country code and product name can be used to restrict access to the data in the user's data store by a consumer. Here, the restrictions may limit user access to only users located in a specific country. In addition, the country restriction can be combined with a product name restriction which further limits access to only a specific row in the data store related to the particular product/product name. Each criterion further restricts access and may be combined with the previous restriction with a logical "AND". Multiple entries in the permissions table for a single user are allowed. Each row further expands access and may be combined with a previous row (or rows) using a logical "OR". One DAC consumer can have multiple DACs. Each DAC added further restricts access and is combined with the previous DAC with a logical "AND". If one DAC consumer is used in another model, the authorizations are inherited by the model.

In a related art, the only accepted permissions entity and DAC format is what is referred to as a single values list which requires the authorizations administrator to identify every single authorized value for a given user in the permissions table. For example, each specific row that a user has access to must be identified by its row ID. As useful, powerful, and flexible as this concept is, it has significant shortcomings. As an example, one drawback is it lacks intuitiveness because it can be difficult to read the contents of a permissions entity. If a model aggregating data from protected dataset is displaying more or less data than intended, it can be difficult to debug which individual rows should be added/removed/modified in the authorizations. Another drawback is the lack of maintainability. Each time a new attribute value is added in the unprotected dataset, corresponding entries must be added in the permissions entity. This results in a lot of updates over time to the permissions object. Another drawback is management of users with "full" access. For example, full access users must maintain every combination of single values in the unprotected dataset. If there are many full access users on the system, it is possible for the permissions entity to grow larger than the unprotected dataset itself.

In the example embodiments, a new type of permissions object is provided in conjunction with a singles values list and which enables logical expressions to be used to define row-level security. For example, the permissions object may be encoded with rules that uses the logic expressions in addition to or instead of the single values. Each rule may have three parts including a sign (e.g., include or exclude), an operator (e.g., AND, OR, BT (between), CP (contains pattern), GT (greater than), LT (lower than, etc.), among others, and a value or values range. With these simple parts, users can define complex authorization rules. The rules may be stored within the permissions object and used to restrict/protect data before it ever leaves its space/location in the data store.

FIG. 1A illustrates an environment 100 that includes a host platform 120 that performs access controls based on logical expressions in accordance with an example embodiment, and FIG. 1B illustrates a process 130 of defining data permissions for a space within a database in accordance with an example embodiment. Referring to FIG. 1A, a user may access one or more software applications such as software application 122 hosted on the host platform 120 via a user device 110 such as a personal computer, a mobile device, a smart-wearable, and the like. The user device 110 may connect to the host platform 120 over a computer network such as the Internet.

In the example of FIG. 1A, the software application 122 may store data in a database 126. In this example, the database 126 includes an application programming interface (API) 124 that manages access to the database 126. In addition, the database 126 also includes permissions 128 which may be include data objects that are stored in the database 126 or in a separate storage. The permissions 128 may define data access controls to the tables of data that are stored in the database 126. For example, the permissions 128 may include row-level permissions that are defined using logical expressions. The permissions 128 may be generated by an owner of the data via a user interface 102.

In the example of FIG. 1A, the user device 110 is access the data through the software application 122 hosted on the host platform 120. As another example, the access may be performed by a different software application instead of a user. For example, a software application running on the host platform and storing data within a different space in the database 126 may request access to the user's data stored in a different space within the database 126. In this case, the data may be accessed by the different space. However, prior to this access, the permissions may be applied to limit which data is made accessible to the different space before the data is accessed. Here, the database 126 can restrict access using logical expressions which can be defined in a fraction of the time than an access control list that must have an access control value for each row in the database table.

Referring now to FIG. 1B, the user's data is stored in a space 140 within the database 126. Here, the space 140 includes the users data (unprotected data set 142) stored therein which may include one or more tables of data, or the like. The space 140 includes a permissions object 144 with rules therein defining restrictions to the unprotected data set and a data access control 146 which is configured to consume the permissions object 144 and apply the rules therein to the unprotected data set 142 to generate a protected data set 148. The protected data set 148 may then be sent to another space, external system, user, etc.

Protecting the data set may be a multi-phase process. During a first phase (i.e., design time), a structure for access rules can be defined for the data set by a user such as an administrator, an owner of the data set, or the like. The structure of the access rules may describe what permissions objects will be considered when evaluating the access rules. Furthermore, it may describe how the columns in those permissions objects should be mapped to the columns in the unprotected data set, and which columns of the permissions object influence which parts of the rule (such as the operators, sign, and values). During the second phase (i.e., runtime), access rules can be defined for the data set by a user such as an administrator, an owner of the data set, or the like. The access rules may be user-specific (external users of the system) and may rely on logical expressions to identify which rows of data are restricted from access and which rows are available to access. The access rules may be stored within a permissions object associated with the data set in the database. The rules are essentially a model for accessing the data set, and may be referred to herein as an "authorization model". With the authorization model developed during the first phase, the authorization model can then be applied to data access events during a second phase (i.e., runtime).

Figure 2:
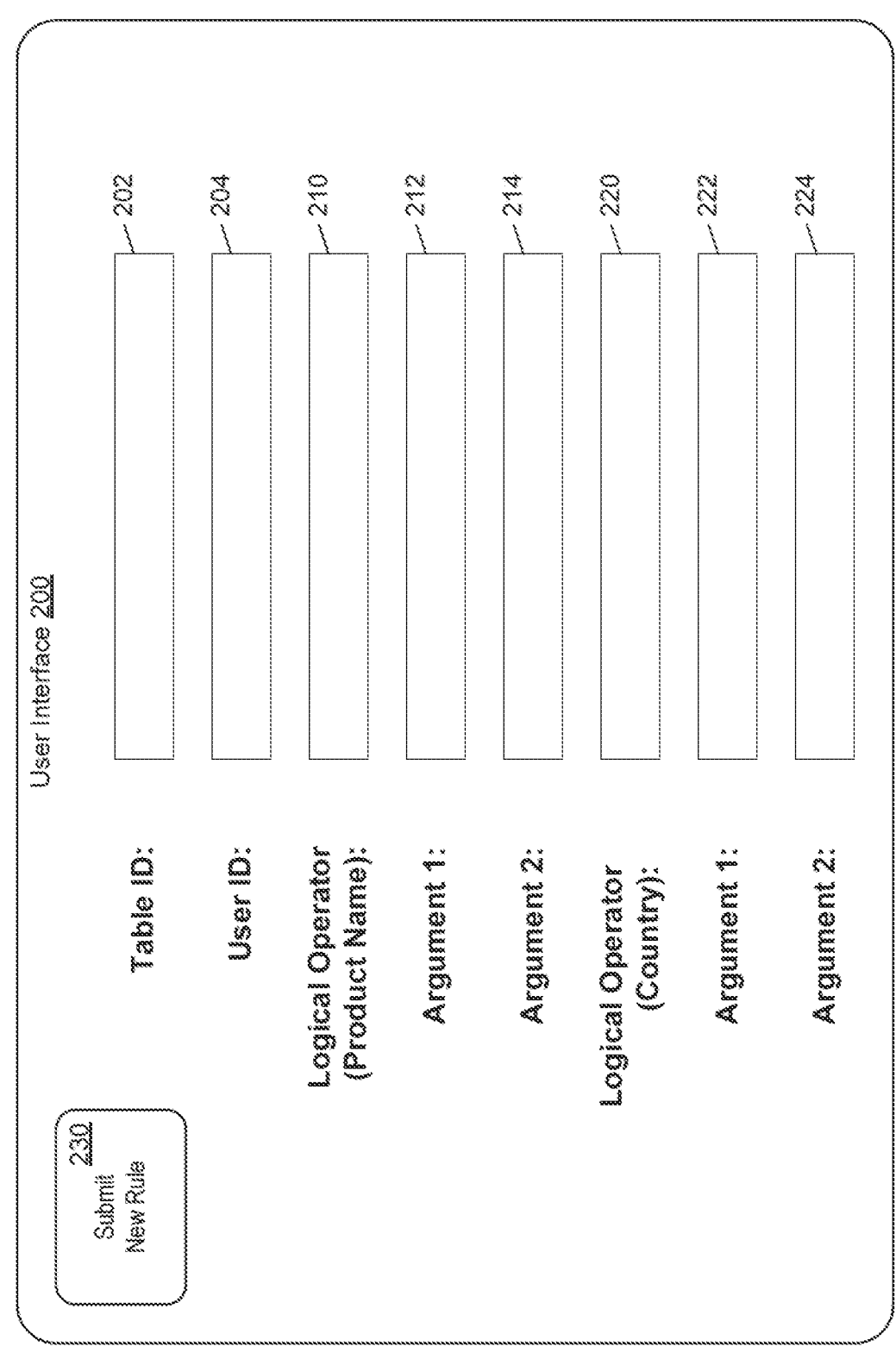
FIG. 2 is a diagram illustrating a user interface for defining a data permission using logical operators in accordance with an example embodiment.

FIG. 2 illustrates a user interface 200 for defining a data permission rule using logical operators in accordance with an example embodiment. Through the user interface 200, a user can define a data access rule that may be stored within a permissions object and used as part of the authorization model for the data set. Rules may include logical expressions in which values for rows can be combined using logical operators thus reducing the amount of data access rules that are needed by the data store. For example, referring to FIG. 2, the user interface 200 may be displayed as part of a larger software application such as one of the applications 122 shown in FIG. 1A. Here, a developer or owner of the application may designate access rules for the data that is generated and used by the software application (referred to herein as application data). The application data may be stored in a database or other data store that provides spaces, but embodiments are not limited thereto.

In FIG. 2, the user interface 200 includes a field 202 which enables the owner to define a table or tables that are the subject of the rule. The user interface also includes a field 204 that identifies the person/user that the rule applies to. In addition, the user interface 200 includes two different sets of fields including a first set of fields including a field 210, a field 212, and a field 214 that can be used for defining a first access rule for product name values and a second set of controls 220, 222, and 224 for defining a second access rule for country location. Each of the sets of fields may be used to define a different rule that is associated with the same user on the same table of data.

For example, a logical operator may be selected using either the field 210 or 220. These fields may actually be menus with drop-down selections. Examples of the type of logical operators that can be used to define data access rules herein include, but are not limited to, ALL, NULL, NOT NULL, CP (contains pattern), EQ (equals), !=(does not equal), GT (greater than), LT (less than), GE (greater than or equals), LE (lower than or equals), BT (between), and the like. Each rule may include at least one logical operator and at least one argument. In some cases, the rules may include more than one argument such as two arguments or more than two arguments. The field 212 and the field 214 can be used to define the arguments to be used by the operator stored in the field 210.

As an example, the field 210 may be set to the logical operator "BT" which means "between", a first argument in the field 212 may be set to a row "A0" and a second argument in the field 214 may be set to row "A9". In addition, a user value of "user 2" may be added to the field 204. Here, the developer/owner of the data may then press the submit button (button 230) causing the rule to become active on the database/data store. Thus, user 2 may only be able to access country code data that is stored in rows A0 and A9 of the corresponding database table. The owner of the data may use the user interface 200 to build new rules and modify existing rules. Furthermore, in some embodiments, the rules may be combined with each other to create more complex forms of authorization. For example, a second rule may restrict the user from looking at product values for trucks. In this case, the second set of controls 220, 222, and 224

In the example embodiments, the end-user benefits from using the authorization model defined herein in the following ways: (1) reading the permissions entity's content is much more intuitive; (2) one single string value with permissions defined therein can be maintained for each user; (3) if new values are added to the underlying unprotected sales dataset, the controls can be used to restrict the access to the data based on the existing permissions in the permissions object without having to have a new rule or permission object defined. Furthermore, the authorization model also supports using logical expressions with multiple permissions for a given user. For example, two permissions may be expressed with a logical AND or a logical OR in between which define whether both permissions should be applied or only one of the permissions should be applied. All supported operators can be expressed as native SQL operators or convenient acronyms. The system described herein may translate the operators internally and convert them into a single filter string that can be applied for an application user accessing the protected view data.

In some embodiments, the database may be a data ware-house which includes an abstraction layer on top of the database, so it naturally follows that the frameworks used are simply innovative ways to consume database native functionalities. Perhaps the simplest way to understand how to apply these authorizations is by contrast. In the previous DAC implementation (base on lists of individual/single values), the design-time artifacts included (1) unprotected data from one or more sources, (2) a permissions entity containing individual authorization values for each business user and authorization-relevant dimension, (3) data access control returning the authorization values for the current business user, and (4) a view for a protected consumer which filters the unprotected data and performs an INNER JOIN with the DAC results.

In contrast, the example embodiments provide an enhanced data access mechanism based on an authorization model that uses logical expressions (e.g., logical operators, Boolean operators, etc.) to define access restrictions to a data set. The different access rights can be encoded into a single string value that can be processed at once by the database to protect the data before it is transferred to the requesting party or visualized on the screen. In particular, the present appli-cation provides an authorization model which uses logical operators and row identifiers as arguments. The design-time artifacts are still consistent with the previous implementa-tion, but maintained in a totally different manner, including (1) unprotected data from one or more sources, (2) a permissions entity now containing combinations of opera-tors and values for each business user and authorization-relevant dimension, (3) a data access control module that reads data from the permissions entity and creates an autho-rization filter string for the current business user in runtime, and (4) a protected consumer (e.g., view) that combines the unprotected data with the access controls. Individual filters for each attached DAC, are combined, creating a single authorizations filter in runtime, which is then dynamically applied on top of the unprotected data before it is transferred to the consuming system.

One of the significant differences is that authorizations in the example embodiments are represented as filters strings which can be generated and applied during SQL runtime when SQL queries are generated and used to query the data set to return the protected data set. To achieve that, DACs must interpret the contents of the permissions entity and create a user-specific and view-specific filter string that can be interpreted by the database and used to perform an SQL query. The filter string may explicitly define authorizations, and entirely decouple them from the data definitions in the DAC consumers. As convenient and expressive as these filters may be, generating and applying them "on the fly" (in runtime) is a technically challenging task, and is referred to herein as dynamic filtering.

Figure 3:
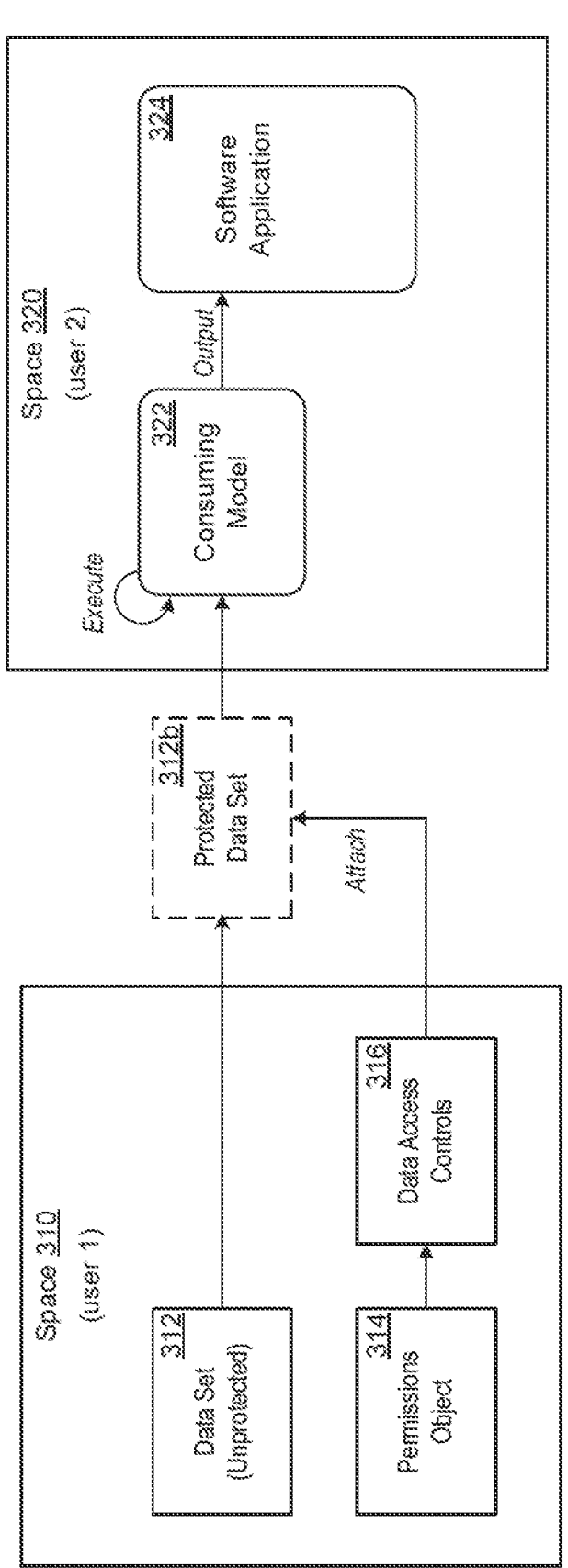
FIG. 3 is a diagram illustrating a process of protecting data according to user permissions within a permissions object in accordance with an example embodiment.
Figure 4:
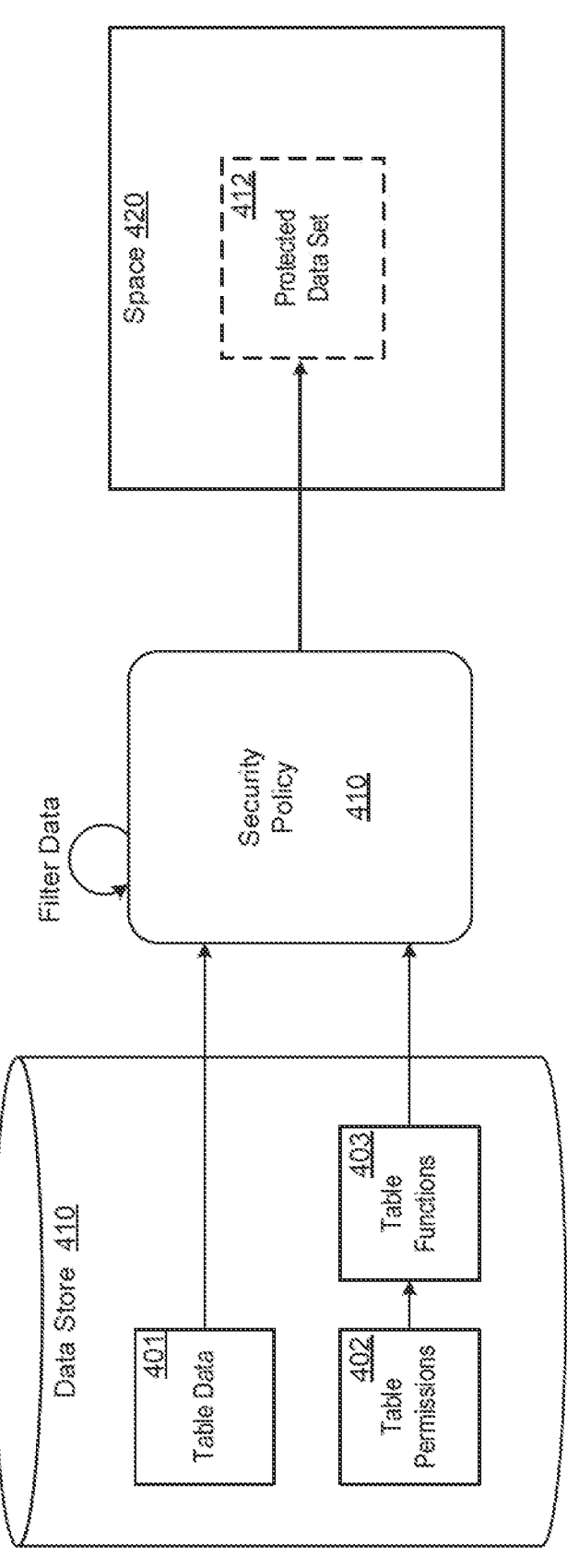
FIG. 4 is a diagram illustrating a process of filtering data to generate protected data according to user permissions in accordance with an example embodiment.

There are multiple mechanisms for executing dynamic SQL on a database when needed for authorizations filtering, including use of an EXEC operator, application of an APPLY FILTER operator, or analytic privileges with a condition provider procedure. Investigations were held to compare each framework, during which it was observed that EXEC operator is strictly worse and less safe than the APPLY FILTER, and the analytic privileges framework was not suitable for usage in a datasphere type storage due to technical limitations that will not be described here. Hence, it was determined that the APPLY FILTER may be used to perform dynamic SQL querying. In addition, a new filtering mechanism referred to herein as a Security Policy may also be used to perform dynamic SQL querying. FIG. 3 provides an example of the APPLY FILTER and FIG. 4 provides an example of the security policy.

FIG. 3 illustrates a process 300 of protecting data accord-ing to an APPLY FILTER in accordance with an example embodiment. Referring to FIG. 3, an unprotected data set 312 is stored in a space 310 of a first entity (e.g., user 1). In this example, a software application 324 that stores its data in a second space 320 requests execution of a model 322 on data from the unprotected data set 312. Here, the software application 324 is in a different space than the space 310 of the database. In this example, before the unprotected data is delivered to the software application 324, the data access control 316 within the space 310 may consume a permission object 314 associated with user 2 and apply the permissions within the permission object to rows of data within the unprotected data set 312 to generate a protected data set 312b that restricts out some of the rows of data as a result of the process. In this example, the permissions may be applied using an APPLY FILTER.

The APPLY FILTER cannot be called with a plain SQL statement, but only by a SQL Script. Therefore, to leverage the APPLY FILTER function, a custom mechanism is intro-duced to materialize multiple SQL artifacts when a database entity consumes a DAC according to various embodiments (i.e., that uses logical expressions including operators and row values). For a database artifact, a 1:1 relationship between it and an SQL artifact created remains, as previ-ously. However, when a potential DAC consumer, in this case a SQL view, decides to attach a rule/logical expression to the data set, a total of four internal artifacts are created, each with its own suffix to avoid naming collisions.

The four artifacts include an unprotected version of the protected dataset which contains the original logic of the protected dataset before the rule was applied by the DAC. The four artifacts also include a condition provider proce-dure which combines all DACs logic applied on the con-sumer into a single string value, in case there are more than one attached. The artifacts also include a wrapper table function that calls the APPLY FILTER operation with the string value generated by the condition provider procedure. The artifacts also include an exposed version of the pro-tected dataset which simply wraps the whole authorization-applying logic on a plain view that can then be shared with external consumers.

In this approach there is a clear separation between the data layer and the authorizations layer performed by the APPLY FILTER. This technical approach has already been implemented and tested internally. Before it was made available to the public, it was observed that, even though it was fully functional, it had severe performance issues. More precisely, the APPLY FILTER operator has a tendency to consume large amounts of memory to apply permissions if the unprotected dataset is very large (i.e., with many rows, columns, and storage consumed). During testing, it was observed that the memory consumption of APPLY FILTER does not depend on the filter applied—i.e., there's no difference between full authorizations (1=1) and partial authorizations (Country Code=A1)—, but it does depend on the size of the unprotected dataset. In informal terms, the reason for this large memory consumption seems to come from the fact that, since the authorizations filter string is dynamically generated, it cannot be considered to create the SQL statement execution plan. During plan creation, the SQL optimizer does not have any information about which columns of the unprotected dataset are accessed for filtering, so that it, at worst, decompresses the entire unprotected dataset and loads it all into memory before applying the filter.

FIG. 4 illustrates a process 400 of protecting data according to a security policy in accordance with an example embodiment. With the goal of enhancing the performance of the system, while maintaining the same authorizations model, several tests were conducted with the Analytic Privileges framework using condition provided procedures. It is different from the APPLY FILTER framework because it evaluates the authorization filter string before creating the SQL execution plan, so that it can be fully leveraged in SQL runtime.

Unfortunately, some limitations of the original analytic privileges framework made it impossible to be consumed in the database. Therefore, the analytic privileges' condition provider framework is exposed via a new functionality that is referred to herein as security policy. The strategy of materializing multiple SQL artifacts per protected dataset will be reused, but the SQL artifacts themselves will be different.

Referring to FIG. 4, since the APPLY FILTER is not needed, there is no unprotected version of the protected data set and there is no wrapper table function. Instead, these functions are replaced by a Security Policy 410 which is attached directly on the protected dataset, and calls the condition provider procedure. Here, the security policy module receives table data 401 (unprotected data), table permissions 402, and table functions 403, and generates a protected data set 412 that can be delivered to a space 420 within the database. Preliminary tests have shown that this framework does not have innate memory consumption issues, but it does take longer to prepare the SQL statement (plan creation), since the authorizations layer is evaluated before the data layer, not concurrently.

Both the APPLY FILTER and the Security Policy have advantages. For example, the APPLY FILTER enables short statement prepare times (SQL plan creation), is suitable for datasets with small-medium data volumes, is fully compatible with SQL views, table functions, calculation views, and DAC table functionality is fully reusable by any consumer, and internal artifacts easily replicable. Meanwhile, the advantages of the Security Policy are that authorizations logic is fully transparent to the SQL optimizer, it is efficient for SQL plan creation and execution, it is capable of filter relocation and pushdown to remote sources, it is suitable for datasets of all sizes, it is fully compatible with SQL views, table functions, calculation views, and DAC table function is fully reusable by any consumer, and internal artifacts easily replicable.

Some of the advantage provided by the example embodiments include intuitiveness because it is easy to read the contents of a permissions entity now that it is a single string value with logical operators and understand which restrictions are being applied to each user. Another benefit if the maintainability of the rules. The authorization layer is less coupled to the data layer thus users almost never need to adjust the permissions whereas in the related art any time a new data piece was added or changed, permissions needed to adjusted for the new data otherwise it would not be properly filtered. Furthermore, is possible to combine very complex authorizations for each user and dimension with logical ANDs (DACs with multiple criteria), and logical ORs (multiple rows in the permissions table).

Additional benefits include granting full data access to users with the custom * or ALL operator, keeping authorizations data as contents of permissions entities and not as metadata, as a result the SQL runtime does not need to call any other services or application layers when accessing data of models with row-level security applied. Another benefit is that both the design-time row-level security artifacts in the database and the application layer and their corresponding runtime artifacts (SQL layer) are fully reusable by any potential consumer (views, table functions, calculation views). Furthermore, even if other database providers have native tooling to apply dynamic SQL for general purposes, the innovation at hand introduces a reusable and human-friendly template to leverage those tools in the context of row-level security. Also, the template is intelligently crafted to apply a clear separation between data definitions and authorizations definitions. Furthermore, it could be possible to translate authorizations from other systems into logical expressions to import existing authorizations from other systems as contents of permissions entities.

Figure 5:
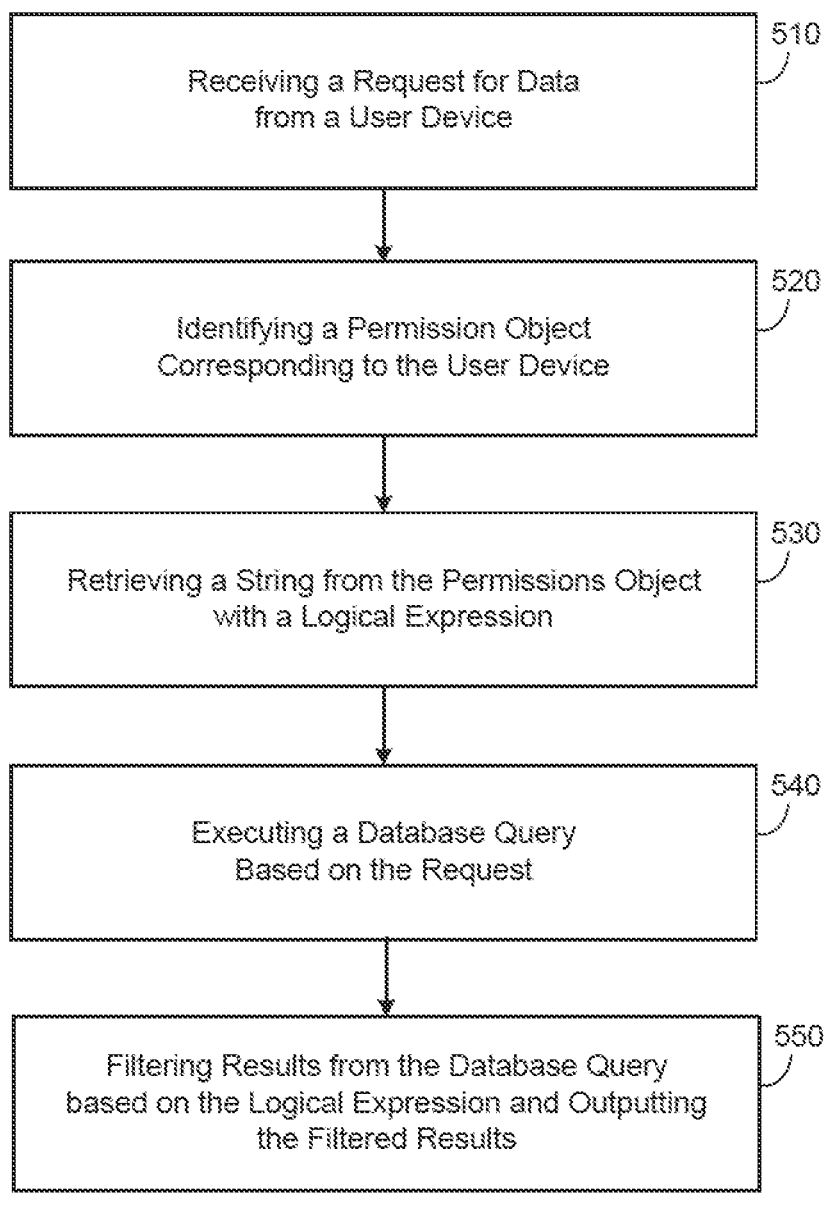
FIG. 5 is a diagram illustrating a method of querying a database based on a logical expression in a permissions object in accordance with an example embodiment.

FIG. 5 illustrates a method 500 of querying a database based on a logical expression in a permissions object in accordance with an example embodiment. For example, the method 500 may be performed by a software application hosted by the host platform such as a cloud platform, a web server, a distributed system, a database, or the like. Referring to FIG. 5, in 510, the method may include receiving a request for data from a user device. The request may be received via an application programming interface, for example. In this case, the request may be an API call, or the like.

In 520, the method may include identifying a permission object corresponding to the user device. In 530, the method may include retrieving a string comprising a logical operator and one or more values from the permission object, wherein the logical operator is combined with the one or more values to define access permissions of the user device with respect to a database. In 540, the method may include executing a database query based on a data store to retrieve data from the database based on the request for data from the user device. In 550, the method may include filtering results from the database query based on the logical operator and the one or more values and outputting the filtered results to the user device.

In some embodiments, the executing may include generating a structured query language (SQL) query on the database to generate the results and filtering each result based on a logical expression that compares values in the respective result and returns a Boolean response. In some embodiments, the executing may include executing a filter function during runtime of the SQL query to filter data from the database based on the logical operator and the one or more values.

In some embodiments, the filtering may include simultaneously filtering the results from the database query during runtime of the database query. In some embodiments, the retrieving may include retrieving the string from an authorization model stored within the permission object, wherein the authorization model defines row-level security for data in the database.

In some embodiments, the method may further include displaying a user interface comprising a workspace for configuring the authorization model, receiving user inputs from the user device via the workspace on the user interface, and defining the authorization model based on the received user inputs. In some embodiments, the logical operator may include one or more of ALL, AND, ANY, BETWEEN, EXISTS, IN, LIKE, NOT, OR, and SOME. In some embodiments, the values may include a lower bound value and an upper bound value which are expected by the logical operator.

Figure 6:
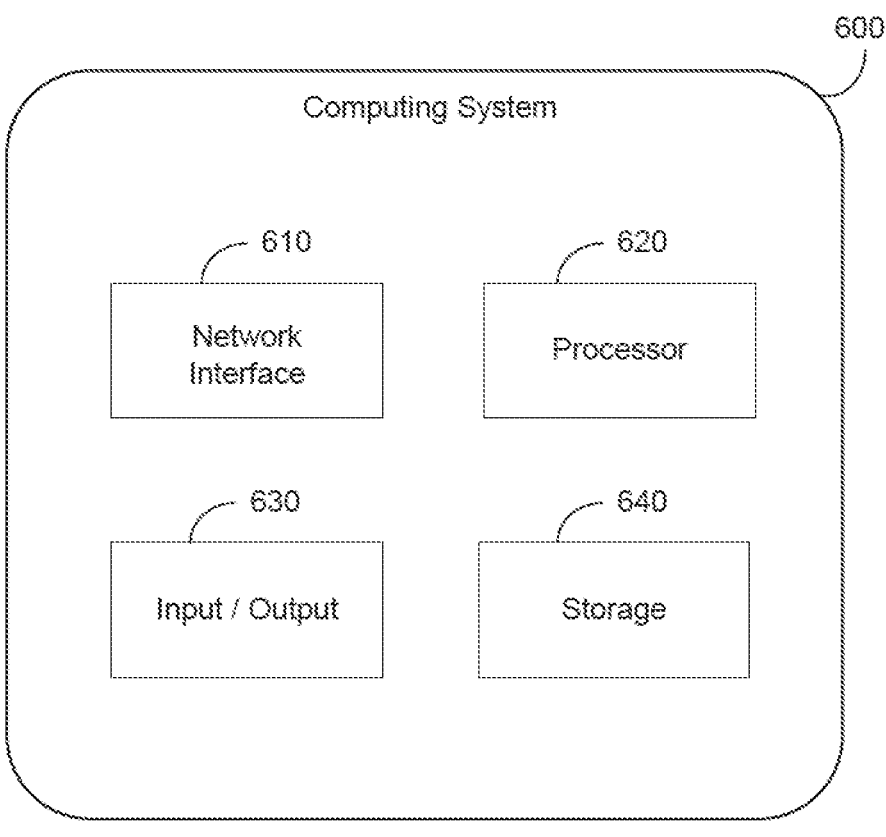
FIG. 6 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the methods described herein. According to various embodiments, the storage 640 may include a data store having a plurality of tables, records, partitions and sub-partitions. The storage 640 may be used to store database records, documents, entries, and the like.

As one example, the network interface 610 may receive a request for data from a user device of a user of a software application. In response, the processor 620 may identify a permission object corresponding to the user. The processor 620 may retrieve a string comprising a logical operator and values from the permission object, wherein the logical operator is combined with the values to defines access permissions of the user with respect to a database of the software application. The processor 620 may generate a database query based on the logical operator and the values. Furthermore, the processor 620 may execute the database query on the database to generate query results and output the query results to the user device.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

a network interface configured to receive a request for data from a user device of a user of a software application; and a processor configured to:

identify a permission object corresponding to the user;

retrieve a string comprising a logical operator and values from an authorization model of the permission object, the values identifying two or more rows of a database of the software application, wherein the values comprise at least one of a lower bound value or an upper bound value which are expected by the logical operator, the logical operator being combined with the values to define access permissions of the user with respect to the two or more rows of the database, the authorization model being stored within the permission object and defining row-level security for data in the database;

generate a database query based on the logical operator, the values, and the authorization model; and execute the database query on the database to generate query results and output the query results to the user device.

2. The computing system of claim 1, wherein the processor is configured to generate a structured query language (SQL) query based on a logical expression that compares the values and returns a Boolean response.

3. The computing system of claim 2, wherein the processor is configured to execute a filter function during runtime of the SQL query to filter data from the database based on the logical operator and the values.

4. The computing system of claim 1, wherein the logical operator comprises one or more of ALL, AND, ANY, BETWEEN, EXISTS, IN, LIKE, NOT, OR, and SOME.

5. The computing system of claim 4, wherein both of the lower bound value and the upper bound value are expected by the logical operator.

6. The computing system of claim 1, wherein the processor is configured to execute a script to execute the database query and simultaneously filter results from the database query during runtime of the database query.

7. The computing system of claim 1, wherein the processor is further configured to display a user interface comprising a workspace for configuring the authorization model, receive user inputs via the workspace on the user interface, and define the authorization model based on the received user inputs.

8. A method comprising:
receiving a request for data from a user device;
identifying a permission object corresponding to the user device;
retrieving a string comprising a logical expression with a logical operator and values from an authorization model of the permission object, the values identifying two or more rows of a database of the software application, wherein the values comprise at least one of a lower bound value or an upper bound value which are expected by the logical operator, the logical expression defining access permissions of the user device with respect to the two or more rows of the database, the authorization model being stored within the permission object and defining row-level security for data in the database;
executing a database query on the database based on the request to generate results; and
filtering the results from the database query based on the logical expression to generate filtered results and outputting the filtered results to the user device.

9. The method of claim 8, wherein the executing comprises generating a structured query language (SQL) query on the database to generate the results, and the filtering comprises filtering each result based on a logical expression that compares values in the respective result and returns a Boolean response.

10. The method of claim 9, wherein the executing comprises executing a filter function during runtime of the SQL query to filter data from the database based on the logical operator and the one or more values.

11. The method of claim 8, wherein the logical operator comprises one or more of ALL, AND, ANY, BETWEEN, EXISTS, IN, LIKE, NOT, OR, and SOME.

12. The method of claim 11, wherein the values comprise a lower bound value and an upper bound value which are expected by the logical operator.

13. The method of claim 8, wherein the filtering comprises simultaneously filtering the results from the database query during runtime of the database query.

14. The method of claim 8, wherein the method further comprises displaying a user interface comprising a workspace for configuring the authorization model, receiving user inputs from the user device via the workspace on the user interface, and defining the authorization model based on the received user inputs.

15. A computer-readable medium comprising program instructions which when executed by a processor cause a computer to perform a method comprising:
receiving a request for data from a user device;
identifying a permission object corresponding to the user device;
retrieving a string comprising a logical operator and values from an authorization model of the permission object, the values identifying two or more rows of a database of the software application, wherein the values comprise at least one of a lower bound value or an upper bound value which are expected by the logical operator, the logical operator being combined with the one or more values to define access permissions of the user device with respect to the two or more rows of the database, the authorization model being stored within the permission object and defining row-level security for data in the database;
executing a database query based on a data store to retrieve data from the database based on the request for data from the user device; and
filtering results from the database query based on the logical operator and the one or more values and outputting the filtered results to the user device.

16. The computer-readable medium of claim 15, wherein the executing comprises generating a structured query language (SQL) query on the database to generate the results and filtering each result based on a logical expression that compares values in the respective result and returns a Boolean response.

17. The computer-readable medium of claim 16, wherein the executing comprises executing a filter function during runtime of the SQL query to filter data from the database based on the logical operator and the one or more values.

18. The computer-readable medium of claim 15, wherein the filtering comprises simultaneously filtering the results from the database query during runtime of the database query.

* * * * *